Patented May 2, 1933

1,906,748

UNITED STATES PATENT OFFICE

FRANK A. GLASS, OF CHICAGO, ILLINOIS

METHOD OF PRODUCING AGGREGATES FROM EARTH SUBSTANCES

No Drawing.  Application filed April 8, 1932. Serial No. 604,120.

My invention has to do with the production of light-weight aggregates made from molten materials such as slags produced in metallurgical, industrial or boiler furnaces. In my prior Patent No. 1,538,482, I have disclosed and broadly claimed an improved process of producing hard cellular aggregates of clay or earth substances, the terms "clay" and "earth substances" being thereto in used in a very broad sense, stated in the specification of said patent.

I have found that the method of production of these aggregates may be further improved by melting minerals or earth substances prior to sintering the aggregate forming mass. The melting of minerals by themselves for that primary purpose only is an expensive step, but I have found that the slags, which are the by-products of smelting processes afford a particularly advantageous material for my present process. I have been particularly successful in producing a very high grade aggregate from blast furnace slag, which is the fused product containing the gangue of the iron ores, the limestone flux and the coke ash, incident to the manufacture of iron. Such slag has hitherto been treated as waste or worse, in that there is considerable expense in carting it away or otherwise disposing of the same. The iron-ore, limestone and coke are mixed in the blast furnace in such proportions as to give a slag of nearly uniform analysis, and this uniformity is of value in producing my aggregate.

The composition of blast furnace slag differs from that of most natural argillaceous or clayey materials in that its base is lime and magnesia, of which substances it contains about one-half of its total weight; of alumina it generally contains about 15% (fifteen per cent) and of silica around 35% (thirty-five per cent). In the natural materials, on the other hand, silica is the chief constituent. Iron blast furnace slags, particularly those issuing from normal blast furnace operations in the production of basic, Bessemer, or foundry iron, are very suitable for my purpose. As these slags flow in the liquid state from the blast furnace I cause them to be granulated by mixing a stream of water under pressure with the liquid slag, or by dropping the liquid slag into a body of water, or by using other cooling and granulated means such as air, or a combination of air and water, or mechanical means of granulating, all of which are known in the art. The granulated slag is porous and cellular and when properly granulated is of a very light weight character. This is important in that in the subsequent heat treating process to which I subject it, the material is more readily fused and produces a more uniform product and a product of light-weight, since the original volume of cells is largely preserved.

The granulated slag in itself is sufficiently light-weight to make aggregate, but the walls of the cells are very friable. Therefore in order to make a strong aggregate I crush the larger particles of granulated slag to convenient size to mix intimately with fuel, but not so fine as to destroy the cellular structure of the small particles; and then subject it to a second fusing or heat treatment, which strengthens the cell walls and fuses the slag particles together. I preferably use the heat treatment process described in my Patent #1,538,482. I have found by that method of heat treatment, I can sinter more uniformly and more economically with a smaller amount of fuel per ton of product and a lesser cost of operation than in kilns.

From the foregoing it will be understood that the initial steps in the improved process consist in melting the mineral substances, in cooling and in granulating or crushing the same to desired size. When this improved process is carried out, in accordance with the process of my prior patent, above identified, the melted minerals or slags are granulated and are commingled with finely divided fuel and preferably with dissimilar mineral substances, such as clays, shales, fluxes, etc. and water or other liquid, such as tar refuse or the like, to moisten the substances. This commingled mass in uniformly and freely permeable condition is spread in a relatively thin stratum upon a pervious supporter or grate. Then the fuel in the commingled mass is ignited at one surface thereof, and concurrently three actions are maintained, to wit: (a) progressively burning out the fuel of the mass by forcing a combustion-supporting gas therethrough; (b) maintaining the commingled mass in a state of quiescence free from mechanical agitation; and (c) cooling that portion of the mass from which the fuel particles have been burned by forcing combustion-supporting gas therethrough on its way to the burning zone.

I have obtained the best results by the process just above stated, but it may be found possible to carry out the present process, broadly considered, by other operations, such as the up-drafting sintering process and by the use of the rotary kiln, which, though less efficient, may in some instances serve the particular purpose, especially where use may be made of existing equipment.

I have found by extensive experimentation that I can vary the quality of my product by mixing unmolten materials with the granulated slag. By mixing up to 20% (twenty per cent) of earthly material, such as slatery coal mine refuse, with granulated slag and the necessary fuel, I can produce an aggregate which is lighter in weight than many other similar aggregates which are produced by sintering raw unmolten materials. In some cases it may be advantageous to mix larger percentages of unmolten materials with the slag, the percentages depending not only on the quality desired but also on the cost of assembly of the materials.

While my experiments have been largely conducted with blast furnace slags in which the bases, lime, magnesia, soda and potash, formed approximately one-half of the weight, I have found that slags with a higher or lower silica or alumina content than is present in ordinary blast furnace slag, also can be treated successfully by my process, providing they are derived from a melting operation which caused them to be completely molten prior to granulating or crushing, and sintering. I therefore do not limit myself to the slags from iron blast furnaces, but may use slags from open hearth furnaces which run higher in lime and magnesia or I may mix blast furnace and open hearth slags in their granulated or crushed form and sinter them together or I may use slags from copper or lead or other metallurgical furnaces or boiler furnaces by themselves or mixed with other slags or mineral substances.

What I claim is:

1. The process of producing from earth minerals a light-weight cellular mass suitable for concrete aggregates and like purposes, which consists in melting earth minerals, cooling and granulating the resulting slag and thereafter commingling the granulated slag with finely divided fuel, and sintering the same.

2. The process of producing from earth minerals a light-weight cellular mass suitable for concrete aggregates and like purposes, which consists in melting earth minerals, cooling and granulating the resulting slag and thereafter commingling the granulated slag with finely divided fuel and with a finely divided dissimilar substance that has not been melted, and then sintering the commingled mass.

3. The process of producing from earth minerals a light-weight cellular mass suitable for concrete aggregates and like purposes, which consists in melting earth minerals, cooling and granulating the resulting slag and thereafter commingling the same with finely divided fuel, and with a finely divided dissimilar substance that has not been melted, moistening this commingled mass, and then sintering the same.

4. The method of producing light-weight aggregate which consists of the following consecutive steps, first melting the minerals, then granulating the molten mass, then crushing the granulated product mixing with fuel and a liquid, sintering it and recrushing it.

5. The production of light-weight aggregate from molten slag which consists in granulating and crushing the slag and then fusing it by mixing it with fuel and down-drafting the mixture.

6. The method of producing light aggregate from molten slag which consists in mixing the slag with unmolten materials and sintering the mixture.

7. The method of producing light aggregate which consists in granulating molten slags, mixing with them other materials of unlike chemical composition and sintering the mixture.

8. The method of producing light aggregate which consists in melting minerals, cooling and breaking up the resulting slag, mixing with it fuel and mineral substances of different chemical composition, and sintering the mixture by the down-draft process.

9. The process of producing from slag resulting as a waste by-product in the reduction of metallic ores, a light-weight cellular material suitable for concrete aggregates and like purposes, which consists in granulating the same, commingling the granulated slag with finely divided fuel, in maintaining the commingled mass in uniformly and freely permeable condition and igniting the fuel of the mass at one surface thereof, and in concurrently maintaining three actions, to wit: (a) progressively burning out the fuel of the mass by forcing a combustion-supporting gas therethrough; (b) maintaining the commingled mass in a state of quiescence, free from mechanical agitation; and (c) cooling that portion of the mass from which the fuel particles have been burned by forcing the combustion-supporting gas therethrough on its way to the burning zone.

10. The process of producing from slag resulting as a waste by-product in the reduction of metallic ores, a light-weight cellular material suitable for concrete aggregates and like purposes, which consists in granulating the same, commingling the granulated slag with finely divided fuel and with finely divided earth substances, in maintaining the commingled mass in uniformly and freely permeable condition and igniting the fuel of the mass at one surface thereof, and in concurrently maintaining three actions, to wit: (a) progressively burning out the fuel of the mass by forcing a combustion-supporting gas therethrough; (b) maintaining the commingled mass in a state of quiescence, free from mechanical agitation; and (c) cooling that portion of the mass from which the fuel particles have been burned by forcing the combustion-supporting gas therethrough on its way to the burning zone.

11. The process of producing from slag resulting as a waste by-product in the reduction of metallic ores, a light-weight cellular material suitable for concrete aggregates and like purposes, which consists in granulating the same, commingling the granulated slag with finely divided fuel and finely divided earth substances, and moistening the commingled mass, in maintaining the commingled mass in uniformly and freely permeable condition and igniting the fuel of the mass at one surface thereof, and in concurrently maintaining three actions, to wit: (a) progressively burning out the fuel of the mass by forcing a combustion-supporting gas therethrough; (b) maintaining the commingled mass in a state of quiescence, free from mechanical agitation; and (c) cooling that portion of the mass from which the fuel particles have been burned by forcing the combustion-supporting gas therethrough on its way to the burning zone.

In testimony whereof I affix my signature.

FRANK A. GLASS.